US 6,810,146 B2

(12) United States Patent
Loui et al.

(10) Patent No.: US 6,810,146 B2
(45) Date of Patent: Oct. 26, 2004

(54) METHOD AND SYSTEM FOR SEGMENTING AND IDENTIFYING EVENTS IN IMAGES USING SPOKEN ANNOTATIONS

(75) Inventors: Alexander C. Loui, Penfield, NY (US); Amanda J. Stent, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 635 days.

(21) Appl. No.: 09/872,593

(22) Filed: Jun. 1, 2001

(65) Prior Publication Data

US 2003/0059112 A1 Mar. 27, 2003

(51) Int. Cl.$^7$ ............................. G06K 9/34; G06K 9/62; G10L 15/00
(52) U.S. Cl. ..................... 382/173; 382/224; 704/235
(58) Field of Search .................. 382/172, 173, 382/181, 182, 190, 192, 224, 266; 704/9, 10, 230, 231, 235, 246, 251, 257; 707/512, 513, 515, 531, 532

(56) References Cited

U.S. PATENT DOCUMENTS

| | | | | |
|---|---|---|---|---|
| 5,339,385 A | * | 8/1994 | Higgins | 704/246 |
| 5,579,471 A | | 11/1996 | Barber et al. | 395/326 |
| 5,862,519 A | * | 1/1999 | Sharma et al. | 704/231 |
| 6,161,108 A | | 12/2000 | Ukigawa et al. | 707/104 |
| 6,250,928 B1 | * | 6/2001 | Poggio et al. | 434/185 |
| 6,272,461 B1 | * | 8/2001 | Meredith et al. | 704/235 |
| 6,332,122 B1 | * | 12/2001 | Ortega et al. | 704/270 |
| 6,360,237 B1 | * | 3/2002 | Schulz et al. | 715/531 |
| 6,477,491 B1 | * | 11/2002 | Chandler et al. | 704/235 |
| 6,487,531 B1 | * | 11/2002 | Tosaya et al. | 704/246 |
| 6,563,911 B2 | * | 5/2003 | Mahoney | 379/88.03 |
| 6,701,293 B2 | * | 3/2004 | Bennett et al. | 704/251 |
| 6,741,963 B1 | * | 5/2004 | Badt et al. | 704/270 |

OTHER PUBLICATIONS

U.S. patent application Ser. No. 09/685,112, Henry Lieberman et al., filed Oct. 10, 2000.

"Information Extraction: Beyond Document Retrieval" by Robert Gaizauskas and Yorick Wilks. Computation Linguistics and Chinese Language Processing, vol. 3, No. 2, Aug. 1998, Computational Linguistics Society of R.O.C., pp. 17–60.

"FASTUS: A Cascaded Finite–State Transducer for Extracting Information from Natural–Language Text" by Jerry R. Hobbs, Douglas Appelt, John Bear, David Israel, Megumi Kameyama, Mark Stickel, and Mabry Tyson in Roche and Schabes, editors, *Finite State Devices for Natural Language Processing*, MIT Press, Cambridge, MA, 1996.

"XML Tools and Architecture for Named Entity Recognition" by Andrei Mikheev, Claire Grover and Marc Moens in *Markup Languages: Theory and Practice*, 1(3), 1999, pp. 89–113.

Hidden Markov Model toolkit (HTK), available on the Web from Cambridge University Engineering Dept. at http://htk.eng.cam.ac.uk.

"ViaVoice, 2000". Available from IBM at http://www.ibm-.com/software/speech.

* cited by examiner

Primary Examiner—Andrew W. Johns
Assistant Examiner—Amir Alavi
(74) Attorney, Agent, or Firm—David M. Woods

(57) ABSTRACT

A method for automatically organizing digitized photographic images into events based on spoken annotations comprises the steps of: providing natural-language text based on spoken annotations corresponding to at least some of the photographic images; extracting predetermined information from the natural-language text that characterizes the annotations of the images; segmenting the images into events by examining each annotation for the presence of certain categories of information which are indicative of a boundary between events; and identifying each event by assembling the categories of information into event descriptions. The invention further comprises the step of summarizing each event by selecting and arranging the event descriptions in a suitable manner, such as in a photographic album.

17 Claims, 4 Drawing Sheets

METHOD AND SYSTEM FOR SEGMENTING AND IDENTIFYING EVENTS IN IMAGES USING SPOKEN ANNOTATIONS

FIELD OF THE INVENTION

This invention relates to the field of image processing, and more particularly to the processing of photographic data in order to automatically organize photographs into photographic albums.

BACKGROUND OF THE INVENTION

Automatic albuming—the automatic organization of photographs, either as an end in itself or for use in other applications—has been the subject of recent research. Relatively sophisticated image content analysis techniques have been used for image indexing and organization. For image indexing and retrieval applications, simple text analysis techniques have also been used on text or spoken annotations associated with individual photographs. The recent research has involved a number of techniques and tools for automatic albuming of photographs, including Using date and time information from the camera to perform event segmentation.

Analyzing image content to perform event segmentation and to identify poor images.

Analyzing video frames for purposes of browsing.

Retrieving images or video segments using text keywords.

The work described herein extends the functionality of albuming applications by extracting certain types of information from spoken annotations, or the transcriptions of spoken annotations, associated with photographs, and then using the results to perform:

Event segmentation—determining how many events are in a roll of film, and which photographs belong to which event.

Event identification—determining the type (e.g. birthday, wedding, holiday) of each event in a roll of film.

Summarization—identifying the date, time and location of events, as well as the people, objects and activities involved, and summarizing this information in various ways.

In this case, natural language (or text based on the natural language) is processed to extract the desired information and the resultant extracted information is used to identify and describe the events.

Broadly speaking, there are currently three different fields that depend on the processing of natural language: information retrieval, information extraction and natural language parsing. In information retrieval, the task involves retrieving specific items from a database, based on a text query. For example, keywords associated with academic papers can be used to retrieve those papers when the user asks a query using those keywords; text associated with images can be used to retrieve images when the same words occur in another text; text found in video sequences can be used to retrieve those sequences when a user clicks on the same text in an article. There is generally very little, if any, text processing involved in these applications; for instance in copending, commonly assigned U.S. patent application Ser. No. 09/685,112, "An Agent for Integrated Annotation and Retrieval of Images", word frequency measures are used to identify keywords to search for in an image database. However, some work has shown that, by applying partial parsing techniques to typed queries, retrieval from a database of annotated photographs can be improved.

In information extraction (IE), the idea is to extract predetermined information from a text. Gaizauskas and Wilks (in R. Gaizauskas and Y. Wilks, "Information extraction: Beyond document retrieval", *Computations Linguistics and Chinese Language Processing*, 3(2), 1998) put it this way: "IE may be seen as the activity of populating a structured information source (or database) from an unstructured, or free text, information source". Applications include analysis, data mining, summarization and indexing. There is a long history of research in automatic information extraction from written news reports (see J. Hobbs, D. Appelt, J. Bear, D. Israel, M. Kameyama, M. Stickel, and M. Tyson. "FASTUS: A Cascaded Finite-State Transducer for Extracting Information from Natural-Language Text", in Roche and Schabes, editors, *Finite State Devices for Natural Language Processing*, MIT Press, Cambridge, Mass., 1996); some more recent work has begun to investigate information extraction from spoken language.

Both information retrieval and information extraction are minimal-processing approaches in that they use only parts of the input text, and ignore any other structure or components that may be involved. Natural language parsing involves the detailed analysis of a piece of text or segment of speech to uncover the structure and meaning of its parts, possibly to identify the intentions behind its production, and possibly to relate it to other parts of a larger discourse. Natural language parsers include linguistically-motivated rule-based parsers and statistical parsers. Partial parsers are capable of analyzing the syntactic structure of selected parts of input texts.

While it would be theoretically possible to use full natural language parsing for the present invention, in practice it is both infeasible and unnecessary. No existing parser is sufficiently general to robustly handle general text input in real or near-real time. Very few parsers even attempt to handle the fluidity and variety of spoken language. Furthermore, natural language parsers would produce unneeded information (detailed information about the syntactic structure of the input) without necessarily yielding information that is needed (the semantic classes of items in annotations).

The use of photograph annotations for automatic albuming is an ideal application for information extraction. Typically, there is interest in the information contained in the annotation associated with a photograph, but not in all of it; for instance, the quality of the photograph or the photographer's feelings at the time are generally not of interest, even though the photographer may have chosen to discuss those things. In addition, there would be little interest in all of the rich semantics and pragmatics that may underlie the language used; in other words, often a very simple understanding of the annotations will suffice. Finally, the robustness of information extraction techniques make them particularly attractive in a situation where the photographer may use incomplete sentences or even just single words or phrases, as in "the fishing trip august nineteen ninety eight adrian mike and charles".

In the past information extraction techniques have been mainly used on newswire texts. These are written texts, relatively short but nevertheless much longer than the typical photograph annotation. Furthermore, photograph annotations (especially with the increasing use of digital cameras with attached microphones) are not carefully organized texts, and may be spoken rather than written. This means that extraction based on photographic annotation cannot depend on some of the textual clues (punctuation, capitalization) on which certain information extraction techniques rely heavily.

SUMMARY OF THE INVENTION

The present invention is directed to overcoming one or more of the problems set forth above. Briefly summarized, according to one aspect of the present invention, a method for automatically organizing digitized photographic images into events based on spoken annotations comprises the steps of: providing natural-language text based on spoken annotations corresponding to at least some of the photographic images; extracting predetermined information from the natural-language text that characterizes the annotations of the images; segmenting the images into events by examining each annotation for the presence of certain categories of information which are indicative of a boundary between events; and identifying each event by assembling the categories of information into event descriptions. The invention further comprises the step of summarizing each event by selecting and arranging the event descriptions in a suitable manner, such as in a photographic album, as well as the utilization of a novel gazetteer in the extraction step that is specialized for consumer images.

The advantage of the invention is that it allows the user's indications that are offered up as casual spoken annotations to be a guide for event segmentation. It has been found possible to use text analysis techniques to extract information from relatively unstructured consumer annotations, with the goal of applying the results to image organization and indexing applications.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because the generalities of automatic albuming and associated image processing are well known, the present description will be directed in particular to attributes forming part of, or cooperating more directly with, the method and system in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
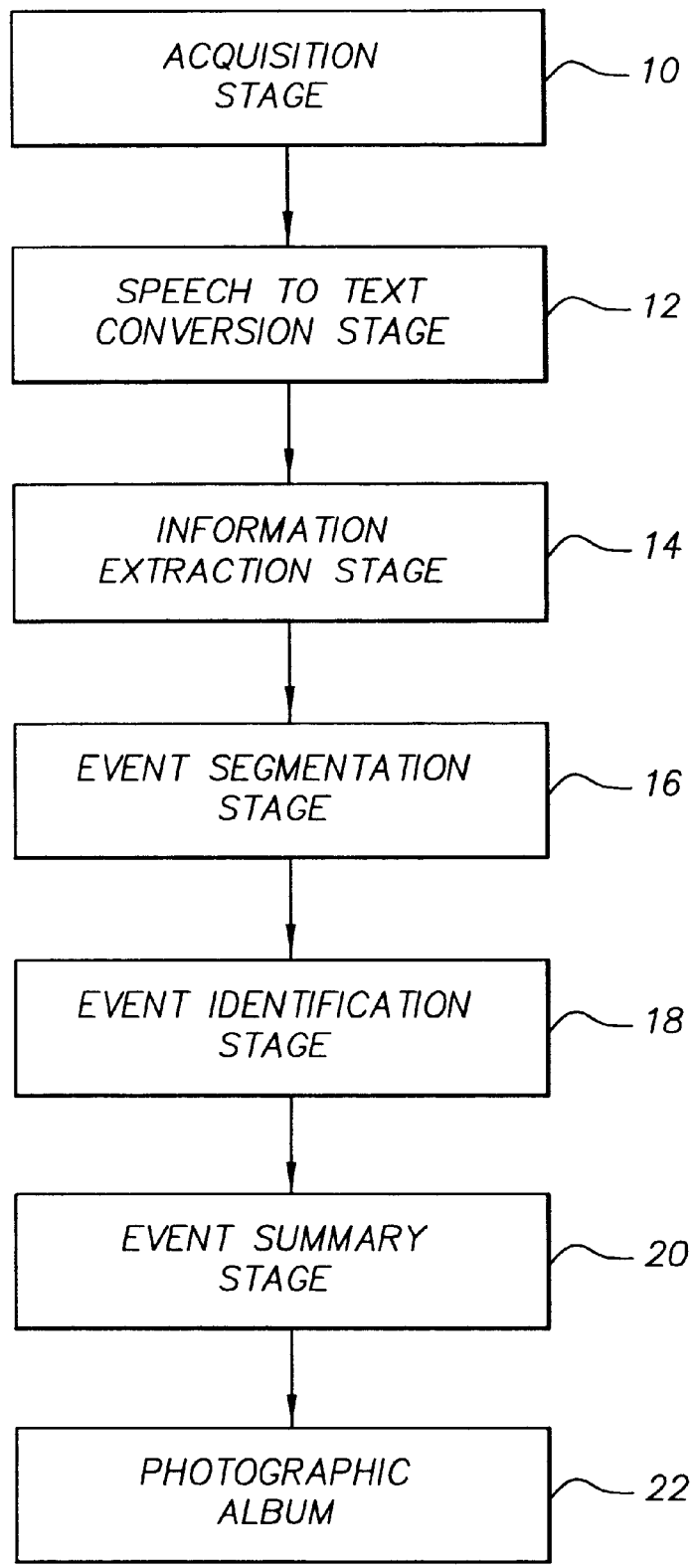
FIG. 1 is a block diagram of the elements of the method and system according to the invention.

Referring to the figures for a more detailed understanding of the invention, FIG. 1 shows an overview of the basic elements of an automatic albuming method and system according to the invention. Images and input speech (or text corresponding to the speech) are acquired in an acquisition stage 10. Where speech is acquired in the stage 10, the input speech is converted into text in a speech to text conversion stage 12 using a conventional speech to text conversion algorithm (e.g., Via Voice, 2000, available from IBM; and S. Young and P. Woodland, Hidden Markov Model toolkit (HTK), available on the Web from Cambridge University Engineering Dept. at http://htk.eng.cam.ac.uk/); if text is initially acquired, then this stage may be bypassed. Next, information is derived from the text in an information extraction stage 14. The number of events, and which photographs belong to which events, is determined in an event segmentation stage 16. The type of each event (e.g., birthday, wedding, holiday) is determined for each event in the event identification stage 18, and characteristics of the events (e.g., date, time, location, and identification of people, objects and activities) are summarized for each event in an event summary stage 20. The product of the method may be event boundaries from the stage 16, identified events from the stage 18, or the ordered summary of events from the event summary stage 20. In the preferred embodiment, the product is a photographic album 22, which may be the final output of the albuming method, or it may be optionally offered up for user review before finalization.

The basic structure of the method and system uses a sequence of finite state machines, each of which performs a specific function (see, e.g., the FASTUS system described by Hobbs et al. (op cit.), which is incorporated herein by reference). Each machine adds some information to the text; some machines may also take information away. The information added is in the form of XML (Extensible Markup Language) tags; the set of tags we use is similar to that used in A. Mikheev, C. Grover, and M. Moens, "XML tools and architecture for named entity recognition", in Markup Languages: Theory and Practice, 1(3), 1999, pp. 89–113, although the scope of these tags may be somewhat different. An outline of the XML document structure is found in Appendix A. As long as the input document adheres to the XML document structure, the finite state machines can be run independently.

Figure 2:
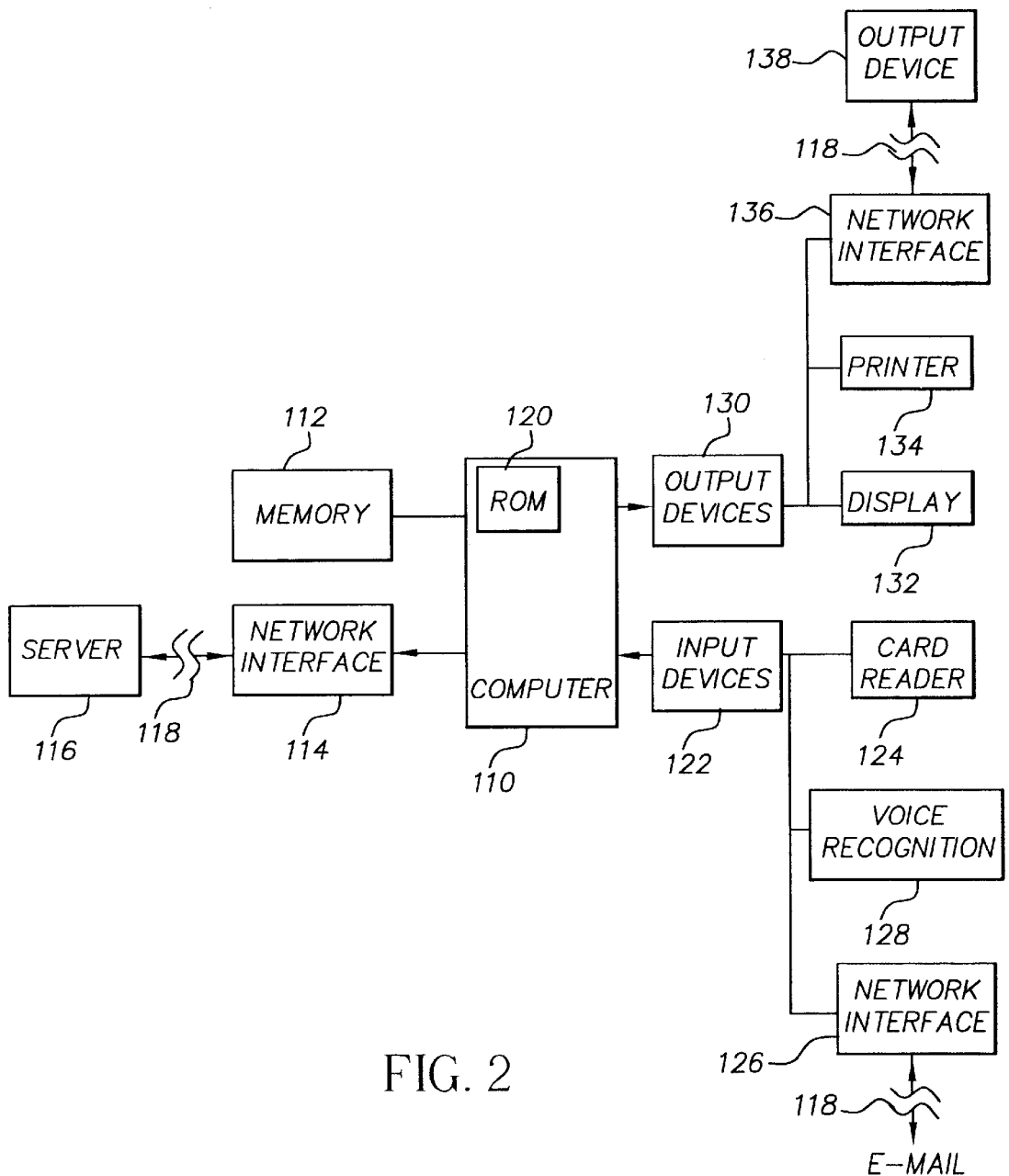
FIG. 2 is a block diagram of a computer system for implementing the present invention.

FIG. 2 shows a computer system which might be utilized to practice the invention. The system includes a computer 110, which may be any of a variety of standard computers or data processors. The size and capability of the computer may vary to some extent with the size of database being accessed, and also with respect to the speed which may be required of the processor to perform the various operations. While for purposes of the following description it is assumed that the same computer 110 is being utilized to extract information from natural-language text, to segment the images into events, to identify and summarize the events and to store the annotated images, this is not intended as a limitation of the invention. For instance, it should be well understood that separate processors may be utilized for the natural language extraction (e.g., a desktop PC) and for the database (e.g., a remote server connected to the desktop PC via the Internet).

The computer 110 includes a large capacity memory 112 in which the images and/or the database to be searched is stored. Alternatively, or in addition to the memory 112, the computer 110 may interconnect via a network interface 114 with a remote server 116 in which the images and/or database is stored. The interconnecting network 118 could be, e.g., a dedicated network or a public network, such as the Internet. These memories may be any kind of large capacity memories, such as various types of high volume hard magnetic, or optical, disk drives. The computer 110 further includes internal memory 120, such as a ROM, which would typically store the software for implementing the inventive method as described herein. Memories 112 and 120 may be separate memories, or may be various sections of the same storage device.

A number of standard input devices 122 may be available for providing information and data to the computer 110. These devices may include without limitation a keyboard device, a mouse, an image scanner or the like. Particular input devices of note include a memory card reader 124 for acquiring images from a memory card (into which a digital camera would offload images), and a network interface 126 for acquiring images from a network source, such as e-mail, through the interconnecting network 118. An optional input device is a voice recognition module 128 with a microphone, which may be utilized to input captions, semantic information, or annotations into the system, or to correct tentative results of the albuming system.

A number of standard output devices 130 may also be connected to the computer, such as a display device 132, a printer 134, and an output device 138 connected through the interconnecting network 118 to a network interface 136. While shown separately for purposes of discussion, it would be understood that the network interfaces 114, 126 and 136 may be the same, or various aspects of the same, interface. Newly captured or processed images could also be sent to the database memory 112 or to the server 116 for indexing and storage.

Figure 3:
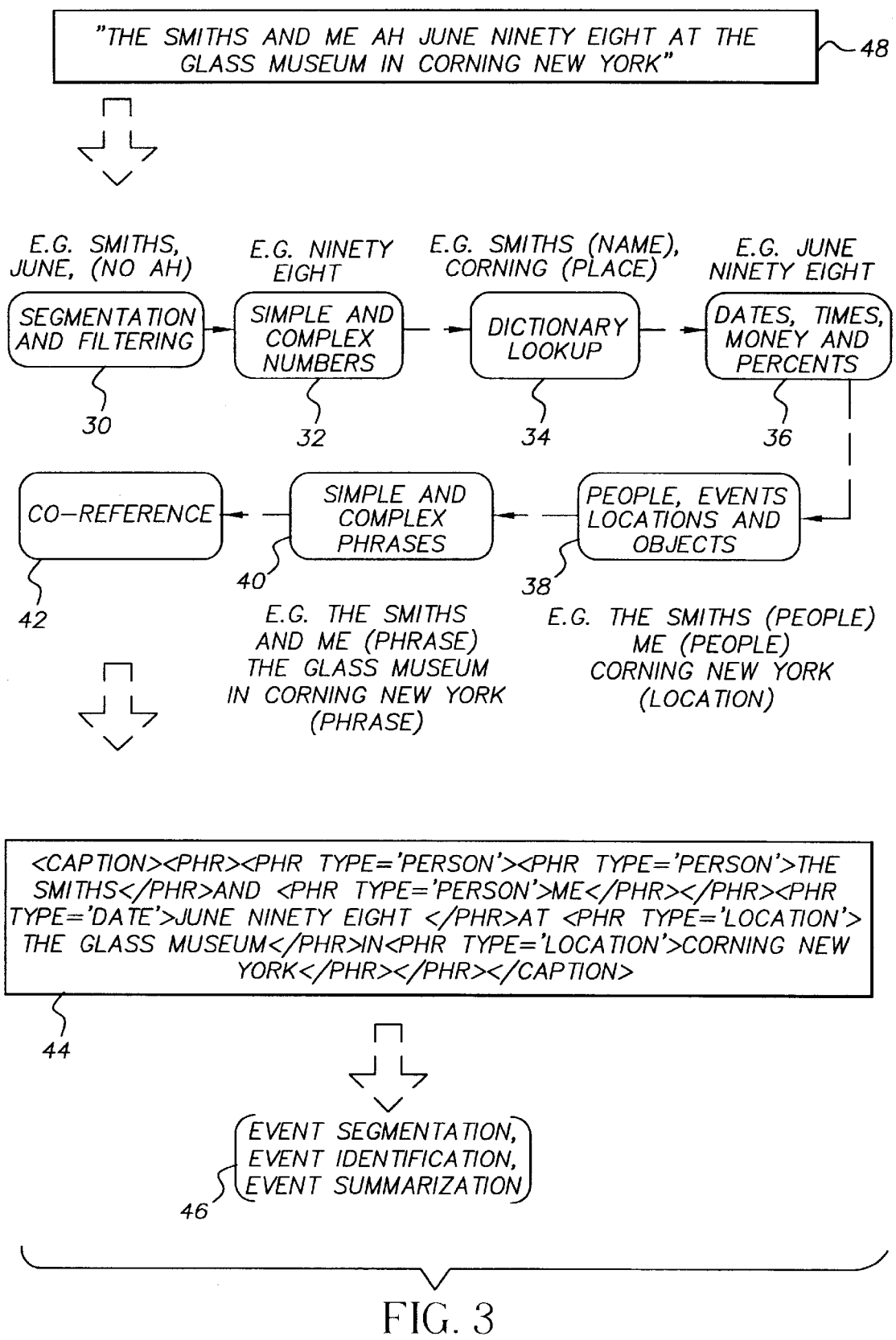
FIG. 3 is a flow sequence diagram of the information extraction element shown in FIG. 1.

Turning first to the information extraction stage 14, the sequence of information extraction processing is illustrated in FIG. 3 as a sequence of stages composed of finite state machines, each of which perform a specific function, and which can be summarized as follows:

Segmentation and filtering (stage 30)—breaking the input transcription into words, sentences (if the relevant punctuation is present) and turns (if there is more than one speaker). Identification of cue words that may signal the presence or absence of a new event. Removal of words and phrases not useful for later processing.

Numbers (stage 32)—identification of simple and complex numbers.

Classification (stage 34)—application of dictionaries/gazetteers to classify important words.

Dates, times, money and percentages (stage 36)—identification of expressions identifying dates, times, money and percentages.

People, locations, events and objects (stage 38)—identification of named entities and other references to people, locations, events and objects.

Phrases (stage 40)—identification of basic and complex phrases and their types.

Coreference resolution (stage 42)—resolution of intra- and inter-annotation references.

This order is not absolute, for example, the numbers stage 32 and the classification stage 34 could be reordered without difficulty, as could the classification stage 34, the dates, times, money and percentages stage 36 and the people, locations, events and objects stage 38. The result is a well-specified XML document 44 from which dates, times, locations, people, activities and objects are extracted for insertion into a database.

Each stage is now described in detail, using as an example the following typical type of spoken annotation 48 (as also shown in FIG. 3):

"the smiths and me ah june ninety eight at the glass museum in corning new york"

Segmentation and Filtering Stage 30

The input to the segmentation and filtering stage 30 is unmarked text; the output of the stage 30 is text in which words, punctuation, sentences and turns have been marked. Certain specifications have been followed as closely as possible, so that:

Possessives are separated—e.g. "sally's" becomes "<W>sally</W><W>'s</W>"

Abbreviations are expanded—e.g. "dr." becomes "<W>doctor</W>"

Contractions are expanded—e.g. "can't" becomes "<W>can</W><W>not</W>"

The <TURN> tag is added to the XML specification because all the annotations in the present data set are transcripts of speech, and some of the transcripts involve multiple speakers (multiple TURNs). If there is no punctuation in the annotation, the segmentation algorithm does not attempt to identify sentences within the input. This works for this application because the annotations are short, typically only one or two utterances, and so it is feasible to build up the sentence structure as we proceed—since we do not have to have it to begin with.

Also in stage 30, cues that can signal an ongoing event are identified and marked. Examples of such cues include:

"this is another picture of"

"more of"

"the third try at"

Such a list of ongoing-event cues, can be obtained from ground truth studies of consumers and their photographs.

Finally, the stage 30 performs filtering. Elements of the input text are removed that are not useful in later processing and may even hinder it. Examples include filler words ("um", "ah", "er"), and phrases that people often use to start an annotation ("this is", "a nice picture of", "here we have").

The output from the stage 30 for our example sentence is:

<CAPTION><PHR><W>the</W><W>smiths</W><W>and</W>

<W>me</W><W>june</W><W>ninety</W><W>eight</W>

<W>at</W><W>the</W><W>glass</W><W>museum</W>

<W>in</W><W>corning</W><W>new</W>

<W>york</W></PHR></CAPTION>

Simple and Complex Numbers Stage 32

The numbers stage 32 includes two finite state machines. The first finite state machine identifies elements of numerical expressions, such as "first", "three million and twenty-two" and "43.5". The second finite state machine combines elements that form parts of numerical expressions, such as "thirty-three" followed by "fifths". The output from this stage for the example sentence is:

<CAPTION><PHR><W>the</W><W>smiths</W><W>and</W>

<W>me</W><W>june</W><PHR C='NUM'>ninety eight</PHR>

\<W>at\</W>\<W>the\</W>\<W>glass\</W>\<W>museum\</W>
\<W>in\</W>\<W>corning\</W>\<W>new\</W>
\<W>york\</W>\</PHR>\</CAPTION>

Classification Stage 34.

Most information extraction systems employ a classification stage using some gazetteers (very simple dictionaries) that contain terms of importance; typically these include lists of proper names, lists of company names, lists of country names and currencies. In a system such as the present one that handles spoken rather than written text, and so cannot take advantage of the clues provided by capitalization, such dictionaries become even more important. Since the genre of consumer photography covers a variety of domains, almost none of which are similar to those covered in the prior art, a specialized gazetteer was created for consumer images. Consequently, and in accordance with a special feature of the invention, the classification stage 34 includes a specialized gazetteer including some typical indices from existing gazetteers and some specialized indices representative of specialized gazetteers that were developed especially for consumer photographs, such as:

Proper names—a list of commonly-used first and last names. These may be obtained, for example, from publicly available name lists such as the CRL Word Lists and from the combination of directories from, e.g., the combined student directories of several universities. If a stop word (e.g. "but") or a verb was listed as a first or last name, the name listing was removed. Corporation names were not included, since few if any corporations were mentioned in the training data.

Places—besides place names from all over the world, it is desirable to include tourist spots. A preferred list of place names, would include the following:

Countries.

States in the USA and provinces in Canada.

Territories and possessions of countries.

Major cities in each state in the USA and in each province in Canada.

Major cities in the world—a list of capital cities, large cities and famous cities.

Tourist spots—a list of possible tourist spots, such as a list of countries and cities popular with tourists, a list of the seven wonders of the ancient world, together with a list of "wonders" of the modern world, the Unesco World Heritage list of protected properties, Places people commonly go for celebrations, education or family events: such as "restaurant", "museum", "art gallery", "school".

Currency names—currency names (singular form only), e.g., obtained from the New York Times. Currency symbols are not important here, since the annotations are spoken. For a few currencies, the plural form was given and that is included; otherwise it is assumed that the plural form is regular.

Function or stop words—a list of pronouns, conjunctions, prepositions and determiners.

Irregular verb forms—a list of approximately 200 irregular verbs, along with their past tense and past participle forms.

Regular verbs—a list of the 600 most common regular verbs in the English language.

College and university names, including universities, colleges and schools in all four tiers, both private and public, as well as the unranked technical and professional schools and service academies. Other American colleges and universities are likely to be fairly unknown and so referred to by their full names, including the designator "college" or "university", which makes them easy to identify. Most foreign universities are named for their location, so they are also easy to identify.

Events—both named events, e.g. "americaid", "wild west tour", and calendar events, e.g. "birthday", "Christmas".

The gazetteer is stored in several category-specific files for ease of manipulation. Each word is stored with its type (e.g. PRONOUN, FIRST_NAME). In the preferred embodiment, over 27000 unique (word/phrase, type) pairs were in the gazetteer. Prior to running the system, the files are merged into one file in which the entries are sorted by alphabetical order; and this makes search much faster.

The classifier is not a finite-state machine; it looks up words and phrases in the gazetteer and when it finds an entry that matches, it attaches all the relevant types to the input word or phrase. It uses a simple stemmer to assist in the search for relevant entries.

For our sample annotation, the classifier gives the following output:

\<CAPTION>\<PHR>\<W C='DET'>the\</W>\<W C='COLLEGE|LASTNAME'>smiths\</W>\<W C='CONJ'>and\</W>
\<W C='PRO'>me\</W>\<W C='FIRSTNAME|LASTNAME'>june\</W>
\<PHR C='NUM'>ninety eight\</PHR>\<W C='PREP'>at\</W>\<W C='DET'>the\</W>\<W>glass\</W>\<W C='LOCATION'>museum\</W>
\<W C='PREP'>in\</W>\<W C='CITY'>corning\</W>\<W C='CITY|STATE'>new york\</W>\</PHR>\</CAPTION>

Dates, Times, Money and Percentages Stage 36

The stage 36 could immediately succeed the number-identification stage 32; it does not require the classification stage 34 to be run first if there are no monetary expressions in the input. In this stage, a variety of date and time expressions are labeled. The types of expressions identified include the following (examples):

this coming monday tomorrow

31 Aug. 1992 (but not 31 Feb. 1992)

31 Aug. 1992 spring of 1993 thanksgiving half past the hour

3:45

The output from this stage for our example is:

\<CAPTION>\<PHR>\<W C='DET'>the\</W>\<W C='COLLEGE|LASTNAME'>smiths\</W>\<W C='CONJ'>and\</W>
\<W C='PRO'>me\</W>\<TIMEX TYPE='DATE'>june ninety eight\</TIMEX>\<W C='PREP'>at\</W>\<W C='DET'>the\</W>
\<W>glass\</W>\<W C='LOCATION'>museum\</W>\<W C='PREP'>in\</W>\<W C='CITY'>corning\</W>\<W C='CITY|STATE'>new york\</W>\</PHR>\</CAPTION>

People, Locations, Events and Objects Stage 38.

This stage 38 identifies references to people, locations, events and objects, including named entities. It is deliberately designed to be more general than most named-entity extraction systems; it recognizes many references that are not proper nouns, among them relationship designators (e.g. "boss", "friend", "grandma"), and locations that are not named (e.g. "college", "school").

For our example, the output from this stage is:
<CAPTION><PHR><W C='DET'>the</W><ENAMEX TYPE='PERSON NAME'>smiths</ENAMEX><W C='CONJ'>and</W><ENAMEX TYPE='PERSON_PRONOUN'>me</ENAMEX><TIMEX TYPE='DATE'>june ninety eight</TIMEX><W C='PREP'>at</W><W C='DET'>the</W><ENAMEX TYPE='LOCATION_NAME'>glass museum</ENAMEX><W C='PREP'>in</W><ENAMEX TYPE='LOCATION_NAME'>corning new york</ENAMEX></PHR></CAPTION>

Simple and Complex Phrases Stage 40

This stage 40 incorporates two finite state machines. One identifies basic phrases, including:

noun phrases—"samantha", "the green cats", "fifteen years". These are sub-categorized according to whether they refer to persons, locations, objects, dates or times.

verb phrases—"will happily go", "was to be eaten". These are marked for their type (e.g. active, passive).

Prepositional phrases are not explicitly marked, but the noun/verb phrases that follow the preposition are marked, and the prepositions themselves impose constraints on the types of these phrases.

The second finite-state machine combines basic phrases into more complex ones, for instance combining "the door" and "of the house", or "september 6" and "at 10 p.m.".

The output from this stage for our sample annotation is:
<CAPTION><PHR><PHR CAT='NP' TYPE='PERSON'><PHR CAT='NP' TYPE='PERSON'><W C='DET'>the</W><ENAMEX TYPE='PERSON_NAME'>smiths</ENAMEX></PHR><W C='CONJ'>and</W><PHR CAT='NP' TYPE='PERSON><ENAMEX TYPE='PERSON_PRONOUN'>me</ENAMEX></PHR></PHR><PHR CAT='NP' TYPE='DATE'><TIMEX TYPE='DATE'>june ninety eight</TIMEX></PHR><W C='PREP'>at</W><PHR CAT='NP' TYPE='LOCATION'><W C='DET'>the</W><ENAMEX TYPE='LOCATION_NAME'>glass museum</ENAMEX></PHR><W C='PREP'>in</W><PHR CAT='NP' TYPE='LOCATION'><ENAMEX TYPE='LOCATION_NAME'>corning new york</ENAMEX></PHR></PHR></CAPTION>

Coreference Stage 42.

There are many coreference algorithms of varying complexity. In this system, the coreference stage 42 implements a very simple recency-based algorithm. The system takes each noun phrase in turn. If the noun phrase is an indefinite noun phrase, then it is assumed to be the first mention of the item referred to by that noun phrase. If the noun phrase is a definite noun phrase, a search is made through previously mentioned noun phrases to see if one can be found that shares its root and matches its type. If the noun phrase is an abbreviation, then a search is made for proper nouns matching the abbreviation. If the noun phrase is a pronoun, then a search is made through previously mentioned noun phrases to see if one can be found that does not disagree with the number and person features and type of the pronoun. Finally, if the noun phrase is a proper noun, then a search is made through previously mentioned noun phrases to see if another (possibly shorter) mention of this proper noun can be found. Because the search is strictly by recency, sentence position and other referential clues are not used, and so the algorithm is deliberately conservative in its search for co-referents to limit the number of errors resulting from this lack.

This is the only stage that operates on a sequence of photographs rather than on a single photograph. No changes are made to the sample sentence in the coreference stage.

Each of the stages in this process shown in FIG. 3 is designed to be as independent from every other stage as possible. No stage refers to or calls another stage directly or indirectly. The XML document structure acts as an API specifying the input and output from each stage. This means that each stage operates essentially as an independent module.

Each stage can be compiled using Flex, a program that compiles lexical analysers (see V. Paxson et al., Flex, version 2.5), mainly for computer languages into a stand-alone program, or can be compiled to run within the framework of the tool. While this facilitates development and maintenance, it has a significant impact on performance. Most importantly, each stage must read through the whole input string; if some stages were allowed to "call" others on parts of the input string (for instance, if the first numerical expression identifier could call the second on only those numerical expressions it identified), this would not be necessary. Nonetheless, the system still manages to process an individual annotation in near-real time.

This strict segmentation of different stages has another effect. Depending on the order the stages are run in, slightly different output can be obtained. This is easy to see by considering the word "june" in the phrase "june california". If the date identification stage is run before the named entity stage, "june" will be marked as a date. If the named entity stage is run first, "june" will be identified as a person's name. Theoretically, it is possible to combine all the rules from all the stages into one; the markup would still depend on which rule was met with first.

The system uses something of a minimal commitment approach to categorization of extracted items. It labels disjunctions of possibilities where it is not certain, so that many items are labeled "PERSON/OBJECT" or "PERSON/OBJECT/LOCATION". The scoring methodology about to be described requires that one of these options be taken and the others discarded. As a result, many items end up in the OBJECT category that were in fact labeled with multiple categories.

Referring now to the event segmentation stage 16 shown in FIG. 1, the hypothesis of the invention is that information in the annotations for an individual photograph may provide evidence for or against the existence of an event boundary at that point. Scores can be computed for each annotation using the output of the information extraction stage 14 that reveals what people, objects, locations, events, dates/times and activities were mentioned in the annotations. These scores provide a measure of the likelihood for and against an event break at that point. Consequently, these scores are used to estimate the locations of event boundaries. If the consumers are fairly direct in their annotations, restricting themselves to discussing the contents of the photographs, the scores will give quite accurate information about event boundaries.

Figure 4:
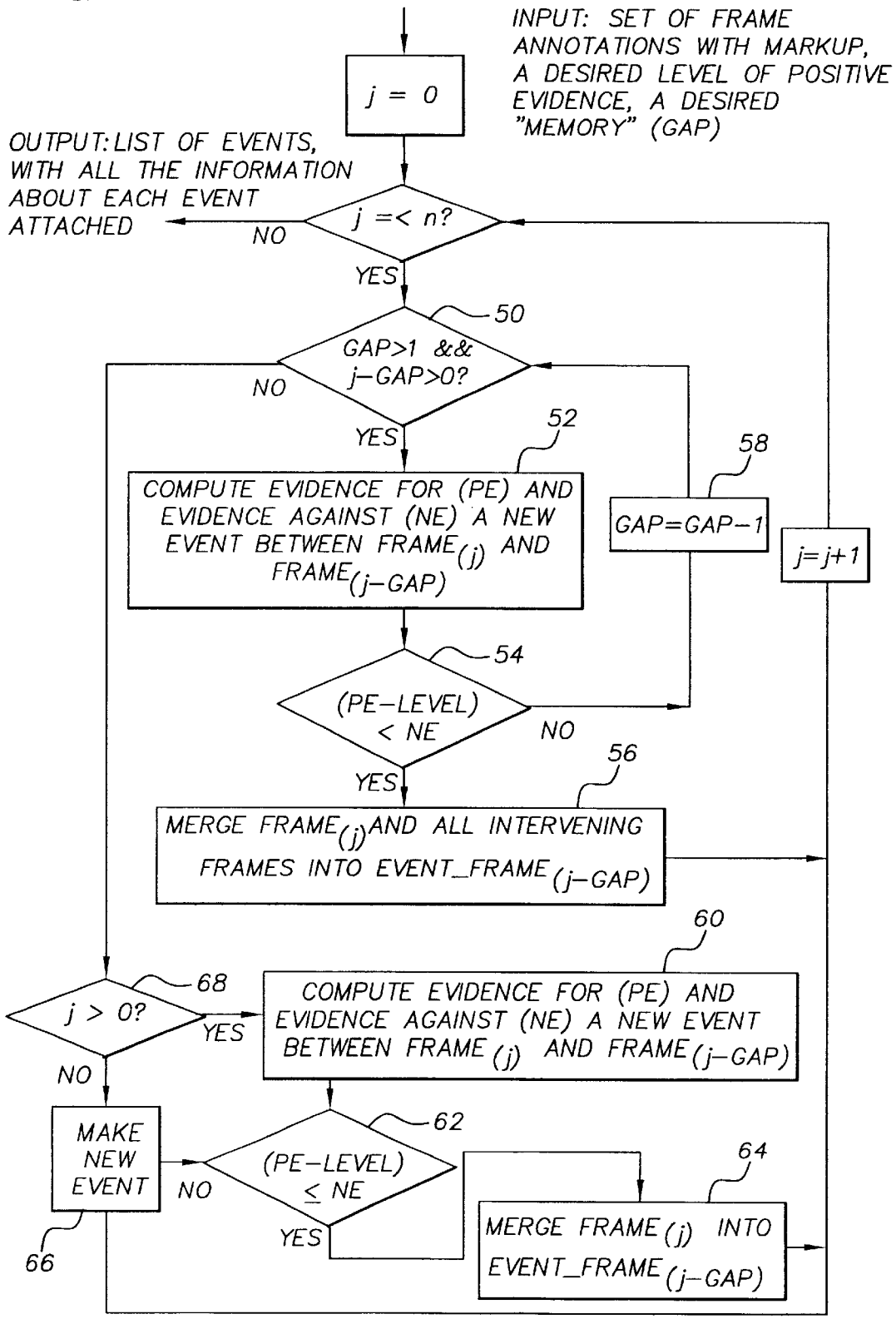
FIG. 4 is a flow sequence diagram of the event segmentation element shown in FIG. 1.

The event segmentation algorithm is shown in FIG. 4. The algorithm examines each annotation in the order in which the photographs were taken. For each annotation, in the preferred embodiment, the following categories of information are examined: events, locations, activities, dates/times, people and objects. It should be clear that other categories of information which delineate events are also within the scope of the invention.

The basic approach is that, given an annotation of a photograph and some information about an event (which comprises the information from annotations of other photographs in that event), the information contained in the annotation is compared to the information known about the event. The algorithm computes the evidence in favor of an event break ("positive evidence" or PE) and evidence against an event break ("negative evidence" or NE) as shown in Table 1. (These heuristics were identified by experimentation, and should not be seen as a limitation on the invention.) If the evidence in favor of an event break at that point outweighs the evidence against one, the algorithm marks an event break and starts a new collection of evidence for the new event. On the other hand, if the evidence against an event break outweighs the evidence for one, the algorithm adds the information from the current annotation to that from the other annotations in the current event. If the score for positive evidence equals the score for negative evidence, or if both are 0, then an event break is not created. More specifically, in practice there is a desired level ("level") of positive evidence relative to negative evidence for a photograph; and when (PE−level)<NE the present photograph is merged into the existing event. Otherwise, a new event is created.

TABLE 1

Scores used in the event segmentation algorithm

| Type of evidence | Positive/Negative | Strength |
| --- | --- | --- |
| no annotation | − | 9 |
| discourse cue(s) signalling an old event | − | 8 |
| previously mentioned event(s) | − | 7 |
| previously mentioned location(s) | − | 6 |
| previously mentioned activity/ies | − | 5 |
| previously mentioned date(s)/time(s) | − | 4 |
| previously mentioned person(s) | − | 2 |
| previously mentioned object(s) | − | 1 |
| discourse cue(s) signalling a new event | + | 8 |
| previously unmentioned event(s) | + | 7 |
| previously unmentioned location(s) | + | 6 |
| pattern(s) of speech known to signal a new event | + | 5 |
| previously unmentioned date(s)/time(s) | + | 4 |
| previously unmentioned activity/ies | + | 3 |
| previously unmentioned person(s) | + | 2 |
| previously unmentioned object(s) | + | 1 |

Sometimes one annotation in a series gives misleading evidence, or one picture in a series is not related to the overall event. To deal with this, the algorithm uses a "gap consideration". If a photograph $Frame_x$ falls within distance gap of a previous photograph $Frame_y$ (i.e. y<x and x−y<gap), and the evidence is in favor of $Frame_x$ belonging to the same event as $Frame_y$, $Frame_x$ and all the photographs between $Frame_x$ and $Frame_y$ will be included in the same event as $Frame_y$. In experimenting with various gap distances from 1 to 10, it was found that a gap of 2 would take care of the misleading annotations in most of the data.

As shown in FIG. 4, the input to the segmentation algorithm is a set of n frame annotations with markup, a desired level of positive evidence (PE), and a desired "memory" (gap). A gap of 2 is preferred, where the present frame (j) is being compared with a previous frame (j-gap) that, for a preferred gap=2, is located two frames before the existing frame (i.e., two side by side frames have a gap=1 and two frames separated by one frame have a gap=2). If the algorithm is processing (step 50) a gap>1, then the actual process of determining which event $Frame_x$ belongs to is as follows:

1. If there is a picture at distance gap from $Frame_x$ and gap>0, compute (step 52) the evidence for and against $Frame_x$ belonging to the same event as $Frame_{x-gap}$.
   a. If the evidence for $Frame_x$ belonging to that event outweighs the evidence against (step 54), put all the frames between x and gap−x in that event (step 56).
   b. Otherwise, subtract 1 from gap (step 58) and go back to step 50.
2. Otherwise (when gap=1), compute (step 60) the evidence for and against $Frame_x$ belonging to the same event as $Frame_{x-1}$.
   a. If the evidence for $Frame_x$ belonging to that event outweighs the evidence against (step 62), put frames x and x−1 in that event (step 64).
   b. Otherwise, make a new event (step 66) for $Frame_x$. In the case where the frame is the first (step 68) in the set (j=0) of frames, then a new event is immediately established (step 66).

The algorithm allows the user of the system to specify a threshold (i.e., a "level") for the evidence in favor of marking event breaks. If the positive evidence score is less than this threshold, it is discounted. The use of this threshold has the effect of discounting specific categories of information; e.g. if the threshold is set at 1, previously unmentioned objects will not be counted as evidence in favor of an event break.

Referring next to the event identification stage 18, as the photographs are segmented into events, all the information from each annotation is collected. This results in a description of each event; in the preferred embodiment such a description includes:

A list of all photographs in that event, with their annotations, both marked and unmarked, and with other information obtained from the camera (e.g. date/time information).

For each category of information (e.g. location, activity), a list of all the datums in that category obtained from any annotation for that event.

The confidence scores for the event segmentation.

The task of event identification is thus reduced to checking if there is an event description in the "event" list (resulting from stage 38); and, if not, trying to put one together from the other categories. While many rules may be used to implement event identification, the following rules have proven satisfactory, with an earlier one taking precedence over later ones:

1. If an event was mentioned, give that event.
2. If the event contains only one photograph, give the annotation for that photograph.
3. If a location was mentioned, give that location.
4. If a person was mentioned, give that person.

5. Give the annotation for the first photograph in the event.

After event segmentation and identification, each event comprises a collection of the people, locations, objects, dates/times, activities and events mentioned in the annotations for that event. In the event summary stage 20, producing a summary for the event is then a matter of selecting and arranging this information in a suitable way.

If a location is mentioned, give it.

If a date/time is mentioned, give it.

Another possibility is the list type of summary, that is, where all the information associated with each event is printed out by category, possibly excluding duplicates but including phrases that refer to the same item (to aid information retrieval). Examples of each kind of summary are given in Tables 2 and 3 for two typical event groupings of photographs.

TABLE 2

| Annotations | List summary | Sentence summary |
|---|---|---|
| this is a parade through the town of randersacker in bavaria this is a poor picture of the same parade in randersacker i was under alot of pressure to shoot it quick because they were moving by very quickly this is a picture of the marktplatz in wurtzburg germany the house is the falcon house which is a very important building that holds the tourist bureau and other interesting features of the town this is a facade of a church on the main street of wurtzburg germany this is a picture of my wife in downtown wurtzburg near the rot house this is a picture of a balloon floating by near the rot house square in wurtzburg | Event number: 1 First frame: 1, last frame: 6 People: i, my wife Events: a parade Locations: the town, wurtzburg, germany, the house, a church Dates: Times: Activities: was, were moving, is, is, building, holds, floating Objects: randersacker, bavaria, alot of pressure, shoot, very quickly, the marktplatz, a very important, the tourist bureau, other interesting features, a facade, the main street, a balloon | Event number: 1 i and my wife at a parade |

TABLE 3

| Annotations | List summary | Sentence summary |
|---|---|---|
| just taking a shot of the house and some of the landscaping this is nineteen ninety eight and just another shot of the house and yard | Event number: 9 First frame: 10, last frame: 11 People: Events: Locations: the house Dates: nineteen ninety eight Times: Activities: is Objects: some of the landscaping, this, yard | Event number: 9 the house , nineteen ninety eight |

Different types of summaries are suited to different types of applications. For information retrieval applications, a preferred summary is probably a list of all the mentioned items in the event, with duplicates (but probably not varying references to the same thing, e.g. "my son" and "john") removed. For automatic album creation, a good summary is a sentence or short paragraph identifying the important information in the event: for example, the event itself, the location, the date/time, and the people involved. Templates for different paragraph summaries could be created; some could be specific to different types of events (e.g. weddings, Halloween, vacations).

From looking at the data, it is clear that to simply conjoin all the annotations for an event would not be an acceptable sentence/paragraph summary. Instead, sentence summaries are constructed as follows (all applicable rules are used):

If five or fewer people are mentioned, list them.

If an event is mentioned, give it.

The invention has been described with reference to a preferred embodiment. However, it will be appreciated that variations and modifications can be effected by a person of ordinary skill in the art without departing from the scope of the invention.

APPENDIX A

XML Specifications

The XML DTD shown here follows XML v. 1.0. For ease of reading, elements should appear in upper-case and text in lower-case
```
<?xml version="1.0"?>
    <!DOCTYPE CAPTION [
    <!ELEMENT CAPTION
(|TURN|PHR|ENAMEX|TIMEX|NUMEX|W|P|S)+>
        <!ELEMENT TURN (PHR|ENAMEX|TIMEX|NUMEX|W|P|S)+>
        <!ATTLIST TURN SPEAKER CDATA #REQUIRED>
        <!ELEMENT PHR (PHR|ENAMEX|TIMEX|NUMEX|W|P|S)+>
        <!ATTLIST PHR
            CAT (NP|VP) #IMPLIED
            TYPE (PERSON_NAME|LOCATION_NAME|EVENT_NAME|
LOCATION|EVENT|DATE|TIME|PERSON|NUMBER|OBJECT|\|)+
```

APPENDIX A-continued

XML Specifications

```
#IMPLIED>
<!ELEMENT ENAMEX (W|P|S)+>
<!ATTLIST PHR
    TYPE (PERSON_NAME|LOCATION_NAME|EVENT_NAME|
LOCATION|EVENT|DATE|TIME|PERSON|
OBJECT|\|)+ #IMPLIED>
<!ELEMENT TIMEX (W|P|S)+>
<!ATTLIST PHR
    TYPE (DATE|TIME|\|)+#IMPLIED>
<!ELEMENT NUMEX (W|P|S)+>
<!ATTLIST PHR
    TYPE (NUMBER|FRACTION|FRACORD|ORDINAL)+
#IMPLIED>
<!ELEMENT W (#PCDATA)+>
<!ELEMENT P (#PCDATA)+>
]>
```

PARTS LIST

- 10 acquisition stage
- 12 speech to text conversion stage
- 14 information extraction stage
- 16 event segmentation stage
- 18 event identification stage
- 20 event summary stage
- 22 photographic album
- 30 segmentation and filtering stage
- 32 numbers stage
- 34 classification stage
- 36 dates, times, money and percentages stage
- 38 people, locations, events and objects stage
- 40 phrases stage
- 42 coreference resolution stage
- 44 XML document
- 48 annotation
- 50 gap checking step
- 52 computation step
- 54 evidence checking step
- 56 merging step
- 58 gap incrementing step
- 60 computation step
- 62 evidence checking step
- 64 merging step
- 66 new event step
- 68 first frame check step
- 110 computer
- 112 large capacity memory
- 114 network interface
- 116 remote server
- 118 network
- 120 internal memory
- 122 input devices
- 124 memory card reader
- 126 network interface
- 128 voice recognition module
- 130 output devices
- 132 display device
- 134 printer
- 136 network interface
- 138 output device

What is claimed is:

1. A method for organizing a plurality of frames of photographic images into events, said method comprising the steps of:

examining annotation data associated with the plurality of frames of photographic images for the presence of items of information in certain categories which are indicative of a boundary between events;

assigning strength values to ones of said items, which are indicative of a boundary between events;

computing the evidence in favor of and against an event break with regard to a current one of said frames by summing the strength values for the current one of said frames relative to a preceding one of said frames already allocated to a current event; and allocating the frame to a new event when the summarized strength values in favor of an event break exceed a predetermined threshold, otherwise allocating the frame to the current event.

2. The method of claim 1 wherein the steps of computing the evidence and allocating the frame are taken with regard to an adjacent frame of the current frame.

3. The method of claim 1 wherein the steps of computing the evidence and allocating the frame are taken with regard to a non-adjacent frame of the current frame, and wherein the allocation of the intervening frames are made on the basis of the current frame.

4. The method of claim 3 wherein the steps of computing the evidence and allocating the frame are taken with regard to a frame that is separated by one frame from the current frame.

5. The method of claim 1 further comprising the steps of:

providing natural-language text corresponding to a plurality of said frames of photographic images; and extracting said annotation data from said natural-language text.

6. The method of claim 5 further comprising the step of:

identifying each event by assembling the respective items of information into event descriptions.

7. The method of claim 6 further comprising the step of selecting and arranging the event descriptions to summarize the events.

8. The method of claim 5 wherein the step of providing natural-language text further comprises:

acquiring spoken annotations; and converting the spoken annotations into said natural-language text.

9. The method of claim 5 wherein the step of extracting predetermined information from the natural-language text comprises:

segmenting the natural-language text into words and sentences; and applying a plurality of dictionaries or gazetteers to the words and sentences to classify important words signifying possible events.

10. The method of claim 5 wherein the step of extracting predetermined information from the natural-language text comprises the steps of:

segmenting the natural-language text into words and sentences;

identifying elements of numerical expression that may help to define events; and identifying expressions signifying at least one of date, time, money and percentage that may further define events.

11. The method of claim 5 wherein the step of extracting predetermined information from the natural-language text comprises the steps of:

segmenting the natural-language text into words and sentences; and identifying references to people, location, events and objects of interest in relation to possible events.

12. The method of claim 5 wherein the step of extracting predetermined information from the natural-language text comprises the steps of:

segmenting the natural-language text into words and sentences; and identifying noun and verb phrases that may relate to possible events.

13. The method of claim 5 wherein the step of extracting predetermined information from the natural-language text comprises the step of extracting the natural-language text according to an XML specification.

14. The method of claim 5 wherein the step of extracting predetermined information from the natural-language text comprises:

segmenting the natural-language text into words and sentences; and applying a gazetteer to the words and sentences to classify important words signifying possible events, said gazetteer comprising a collection of indices including commonly-used proper names, place names including typical tourist spots and celebration places, currency names, function or stop words, irregular verb forms, regular verbs, college and university names and typical events.

15. A computer program product for automatically organizing digitized photographic images into events, said computer program product comprising a computer readable storage medium having a computer program stored thereon for performing the steps of:

examining annotation data associated with the plurality of frames of photographic images for the presence of items of information in certain categories which are indicative of a boundary between events;

assigning strength values to ones of said items, which are indicative of a boundary between events;

computing the evidence in favor of and against an event break with regard to a current one of said frames by summing the strength values for the current one of said frames relative to a preceding one of said frames already allocated to a current event; and allocating the frame to a new event when the summarized strength values in favor of an event break exceed a predetermined threshold, otherwise allocating the frame to the current event.

16. The computer program product as claimed in claim 15 further comprising the step of selecting and arranging the event descriptions to summarize the events.

17. A system for organizing a plurality of frames of photographic images into events, said system comprising:

means for examining annotation data associated with the plurality of frames of photographic images for the presence of items of information in certain categories which are indicative of a boundary between events;

means for assigning strength values to ones of said items, which are indicative of a boundary between events;

means for computing the evidence in favor of and against an event break with regard to a current one of said frames by summing the strength values for the current one of said frames relative to a preceding one of said frames already allocated to a current event; and means for allocating the frame to a new event when the summarized strength values in favor of an event break exceed a predetermined threshold, otherwise allocating the frame to the current event.

* * * * *